United States Patent [19]

Lutz

[11] 4,323,275
[45] Apr. 6, 1982

[54] SUN VISOR WITH AUXILIARY VISORS

[76] Inventor: Rainer M. Lutz, Reichberg 29 - (Postfach 32), D-7827 Löffingen, Fed. Rep. of Germany

[21] Appl. No.: 65,007

[22] Filed: Aug. 8, 1979

[51] Int. Cl.³ ............................................... B60J 3/00
[52] U.S. Cl. .................................. 296/97 G; 296/97 J
[58] Field of Search ............... 296/97 R, 97 C, 97 D, 296/97 E, 97 F, 97 G, 97 H, 97 J, 97 K

[56] References Cited

U.S. PATENT DOCUMENTS 2,385,557  9/1945  Ward ................................ 296/97 G
2,733,763  2/1956  Nygaard .......................... 296/97 G
3,430,299  3/1969  Copen .............................. 296/97 C
4,195,876  4/1980  Timperio ......................... 296/97 G Primary Examiner—Joseph F. Peters, Jr.
Assistant Examiner—John A. Carroll
Attorney, Agent, or Firm—Ross, Ross & Flavin

[57] ABSTRACT

A housing attached to and swingable with a vehicle sun visor accommodates primary, secondary, and tertiary auxiliary visors which are selectively withdrawable through appropriate housing slots into extended positions leftward of, rightward of, and downward of the housing, respectively.

12 Claims, 3 Drawing Figures

SUN VISOR WITH AUXILIARY VISORS

This invention relates to sun visors for motor vehicles.

The object of the invention is a sun visor for motor vehicles with additional dazzle protection and formed from a light impermeable sun visor pivotally mounted on the vehicle which sun visor is capable of being brought into the zone of visibility of the vehicle passengers.

It is known that all sun visors hitherto built in motor vehicles do not give the driver and passenger sufficient protection against dazzle in sunshine and travelling at night.

This drawback of the conventional sun visor offered by the manufacturers of vehicles leads to the fact that the driver of the vehicle, for example, upon being dazzled by the sun's rays is subjected to an increased risk of accident which can lead to serious accidents frequently with fatal consequences.

The sun visors hitherto offered which are built in all motor vehicles by mass production only give a relatively sufficient dazzle protection when the sun's rays come directly from the front. If the sun's rays come in on the right of the driver onto the car the sun visor can indeed be drawn down additionally at the passenger seat but the sun nevertheless can dazzle between the two drawn down visors, through and in fact in the region in which a rear mirror is fixed on the roof of the vehicle.

Due to this intermediate space remaining free and unprotected the driver is dazzled frequently to a dangerous extent. Also when driving up hill a conventional sun visor does not suffice, in particular when the sun's rays come from the front as the sun's rays shine partly under the drawn down sun visor. If the sun's rays come on the left of the driver onto the vehicle he can indeed turn the sun visor to the left but by doing so he is no longer sufficiently protected against dazzle from the front as the direction of the incidence of light changes very quickly according to the direction of travel and the direction of the bents in the road.

The problem of the present invention is to further develop a sun visor of the abovementioned type such that the abovementioned zones of visibility can still be additionally covered to provide an increased dazzle protection for day and night driving. The present invention has the further problem of developing further a sun visor of the abovementioned type so that all zones of visibility endangering the driver due to dazzle can be safely and reliably covered without adversely affecting the drivers safety.

This problem is solved according to the invention in that a housing is connected to the sun visor in which housing auxiliary visors are movably mounted which by withdrawal from the housing are capable of being brought into the zones of visibility covered by the sun visor.

An essential feature of the invention therefore is that a housing is connected to the sun visor from which housing the different auxiliary visors can be drawn out individually or all simultaneously which are capable of being brought into the zones of visibility not covered by the sun visor.

According to the present invention the auxiliary visors are arranged to be capable of being drawn out. Just as satisfactorily it is however also possible for the auxiliary visors to be capable of being flapped out or drawn down like a roller or even mounted to pivot out from the housing.

In a preferred embodiment the sun visor and housing form a unitary part so that the auxiliary visors are withdrawable directly from the sun visor. This embodiment is intended above all as a first equipment for motor vehicles. Thus the conventional sun visor is exchanged in manufacture already as a first equipment for a sun visor according to the invention so that the sun visor according to the invention consists of a conventional sun visor with auxiliary visors movably arranged thereon.

In a second embodiment of the present invention it is arranged for the sun visor and the housing for a two piece part as that the housing is detachably connected to the sun visor. This embodiment is intended for the subsequent equipping of a conventional sun visor with the dazzle protection according to the invention. Thus on the front side of an already present sun visor on the motor vehicle the housing according to the invention is fitted, for example, by means of press buttons or clamping hands or by rubber bands. It is likewise possible for the housing to be connected to a continuous elastic band similar to an elastic hose which is affixed to and surrounds the sun visor. With these fixing measures it is possible to provide a conventional sun visor already present in the motor vehicle with the additional dazzle protection according to the invention.

The invention will be described with reference to the accompanying drawings.

Figure 1:
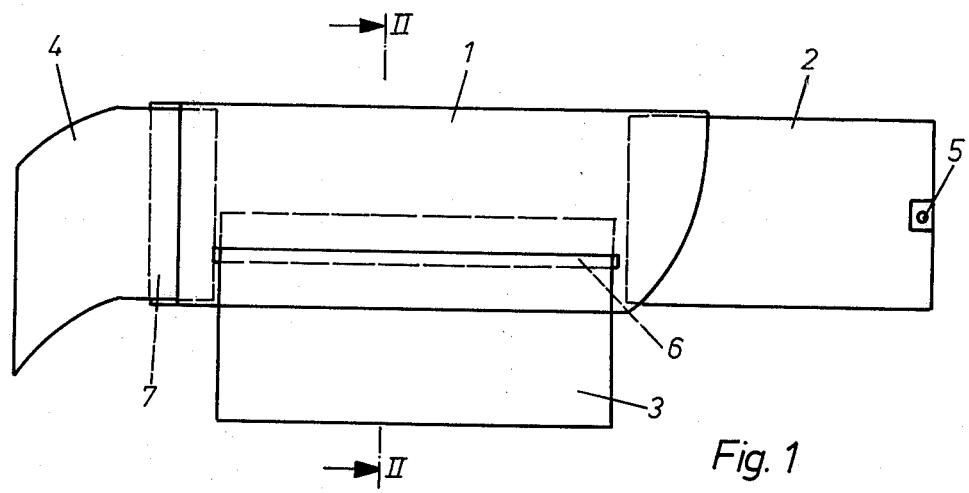
FIG. 1 is a plan view of a housing with auxiliary visors removed.

In FIG. 1 shows a plan view of a housing with auxiliary visors extended. By comparing with FIG. 2 it will be seen that this housing is connected at two places to the sun visor 8 already mounted on the motor vehicle. Just as satisfactory however it is also possible to be able to interpret the representation of FIG. 1 as a plan view of a sun visor integral with a housing for the withdrawable auxiliary visors, 2,3,4. The additional dazzle protection according to the present invention consists of a housing, fixed to the sun visor (see FIG. 2) or formed integrally therewith from which auxiliary sun visors 2,3,4 are drawn out. The auxiliary visors 2,3,4 are according to the showing in FIG. 2 guided in grooves 10 in the housing 1 and have end limiting stops which prevent a complete withdrawal to prevent the auxiliary visors 2,3,4 from falling out of the housing. In the embodiment shown the housing 1 has three withdrawable auxiliary visors 2,3,4. A first auxiliary visor 4 is withdrawable on the left laterally from the housing 1 and projects in the extended position to the side window of the motor vehicle so that the left side head region of the driver can be additionally covered thereby.

For facilitating the drawing out from the housing 1 the housing is provided with a slot 7 so that it is possible to catch hold of the auxiliary visor 4 and draw it out of the housing 1 through the slot 7 into the extended position shown in FIG. 1.

Figure 2:
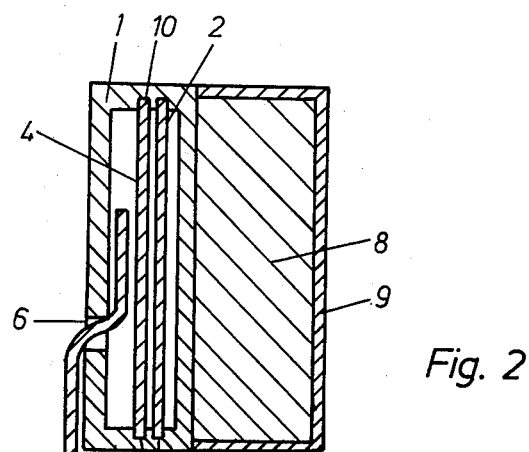
FIG. 2 is a section on line II—II of FIG. 1 in representation not according to scale.

A second auxiliary visor 2 is withdrawable on the right laterally from the housing 1 to cover the zone of visibility between the two known sun visors already present and arranged side by side and spaced apart on the motor vehicle. Thus the zone of visibility in particular in the vicinity of the rear mirror located on the roof inside the motor vehicle is covered. A third auxiliary visor 3, as shown in FIGS. 1 and 2 is withdrawable directed downwardly from the housing 1 and covers the zone of visibility below the downwardly extending sun visor 8 which above all prevents dazzling when the sun is low or when travelling up hill.

Figure 3:
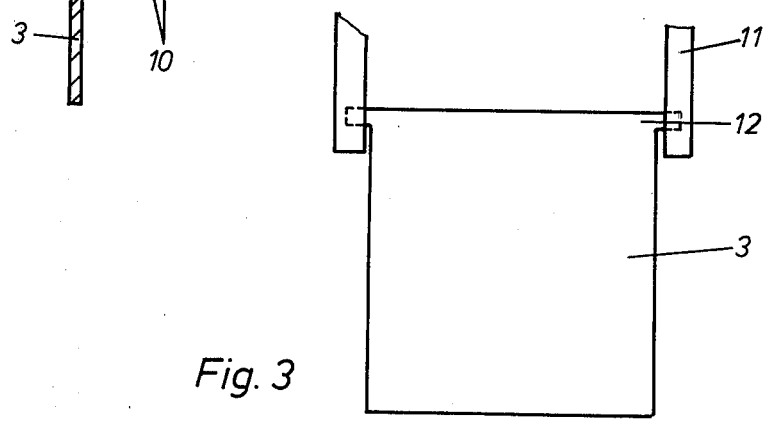
FIG. 3 shows a detail view of the guiding of an auxiliary visor inside the housing.

As shown in FIG. 3 the third auxiliary visor 3 is withdrawable through a slot 6 arranged in the front side of the housing 1. This has the advantage that the auxiliary visor 3 is easily taken hold of and that by bending as it passes through the slot 6 an automatic braking of the auxiliary visor 3 upon drawing out. Just as satisfactory however it is also possible for the third auxiliary visor 3 to be withdrawable from a slot arranged in the bottom region of the housing 1 and for braking means to be provided between the auxiliary visor 3 and the associated faces of the housing 1 which braking means prevent an unintended displacement of the auxiliary visor 3.

The limiting stop may be arranged, for example, as shown in FIG. 3 with a lug 2 on each of the auxiliary visors 2,3,4 the lugs sliding in associated slots 11 inside the housing 1. The lugs 2 on the ends of the visors 2,3,4 forms the stop in order to prevent any further withdrawal of the auxiliary visors. The auxiliary visors 2,3, 4 are withdrawable from the housing 1 individually or all simultaneously according to the zones of visibility to be covered. Furthermore the housing 1 is provided on its front side with a foamed portion as an impact protection. Likewise it is preferred for the auxiliary visors to consist of partially transparent flexible plastics foils.

It may also be arranged that according to the light conditions for the different auxiliary visors for withdrawal from the housing to be of different light permeability. The several auxiliary visors lie side by side in parallel planes and are withdrawable from the housing 1 and each auxiliary visor may have different light permeability properties. If the dazzling and the incidence of light is very strong then for example, an auxiliary visor 2 may be formed, with high light impermeability may be withdrawn whereas if the dazzling is less pronounced and sight through this zone of visibility is desired then instead of the sight impermeable auxiliary visor being made an auxiliary visor with greater permeability can be withdrawn. Instead of single auxiliary visors 2,3, 4 several sets of auxiliary visors may be provided for withdrawal selectively from the housing 1.

Instead of the withdrawal of the auxiliary visors 2,3,4 it is of course possible also to fix the auxiliary visors pivotably on the housing 1 or to draw out the auxiliary visors as a roller blind from the housing 1.

The present invention is therefore not limited to the embodiment illustrated in the drawings.

I claim:

1. In a supplemental glare shield assembly adapted for association with a motor vehicle sun visor pivotally mounted for rotation about a generally horizontal axis and selectively positionable for shielding the head region of a person occupying the front seat of the vehicle, the combination of:
   a housing being detachably connected to the sun visor and swingable therewith and having a hollow interior with groovings in the interior walls and having slotted end and front walls,
   a primary outboard auxiliary visor storable within the housing interior and being selectively withdrawable laterally from the housing interior via the grooving and through the slot of one of the housing end walls and having a curvature for projection to a desired extended position over a side of the vehicle for supplementing the shielding of the occupant forwardly and at one side thereof,
   a secondary inboard auxiliary visor storable within the housing interior and being selectively withdrawable laterally from the housing interior via the grooving and through the slot of the other of the housing end walls for projection to a desired extended position toward the center of the front of the vehicle for supplementing the shielding of the occupant forwardly thereof, and
   a tertiary auxiliary visor storable within the housing interior and being selectively withdrawable vertically downwardly from the housing interior via the grooving and through the slot in the housing front wall for projection to a desired extended position intercepting the occupant's zone of visibility downwardly of the sun visor.

2. In the supplemental glare shield assembly of claim 1, the auxiliary visors being of light impermeable plastic material.

3. In the supplemental glare shield assembly of claim 1, the housing being connected to the sun visor by push buttons.

4. In the supplemental glare shield assembly of claim 1, the housing being connected to the sun visor by clamp bands.

5. In the supplemental glare shield assembly of claim 1, the housing being connected to the sun visor by rubber bands.

6. In the supplemental glare shield assembly of claim 1, the housing being connected to an elastic band circumscribing the housing and sun visor.

7. In the supplemental glare shield assembly of claim 1, the auxiliary visors including stop means for precluding complete withdrawal thereof from the housing interior.

8. In the supplemental glare shield assembly of claim 1, including resilient bumper means on the housing.

9. In the supplemental glare shield assembly of claim 1, the auxiliary visors being of flexible partially transparent plastic material.

10. In the supplemental glare shield assembly according to claim 1, characterized in that a plurality of auxiliary visors lying parallel to one another are capable of being drawn out of the housing, each auxiliary visor having a different light permeability property.

11. A sun visor according to claim 1, characterized in that the third auxiliary visor is capable of being drawn out from through a slot arranged in the bottom area of the housing and brake means are provided by the associated faces of the housing.

12. In a glare shield assembly adapted for use in the manner of a motor vehicle sun visor for shielding the head region of a person occupying the front seat of the vehicle, the combination of:
   a housing being detachably connected to sun visor and pivotally mounted for rotation about a generally horizontal axis and being selectively positionable and having a hollow interior and slotted and grooved end and front walls,
   a primary outboard auxiliary visor storable within the housing interior and being selectively withdrawable laterally from the housing interior via the grooving and through the slot of one of the housing end walls and having a curvature for projection in an extended position over a side of the vehicle for supplementing the shielding of the occupant forwardly and at one side thereof, a secondary inboard auxiliary visor storable within the housing interior and being selectively withdrawable laterally from the housing interior via the grooving and through the slot of the other of the housing end walls for projection in an extended position toward the center of the front of the vehicle for supplementing the shielding of the occupant forwardly thereof, and a tertiary auxiliary visor storable within the housing interior and being selectively withdrawable vertically downwardly from the housing interior via the grooving and through the slot in the housing front wall for projection in an extended position intercepting the occupant's zone of visibility downwardly of the sun visor.

* * * * *